Jan. 28, 1930.　　　S. F. ARBUCKLE　　　1,744,725
HEADLIGHT LENS
Filed April 22, 1927
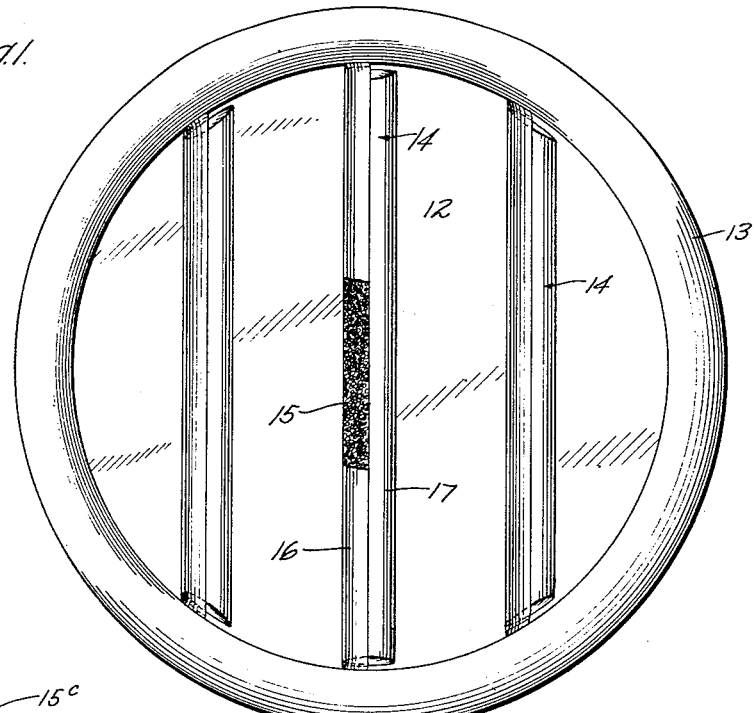
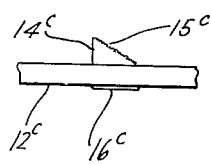
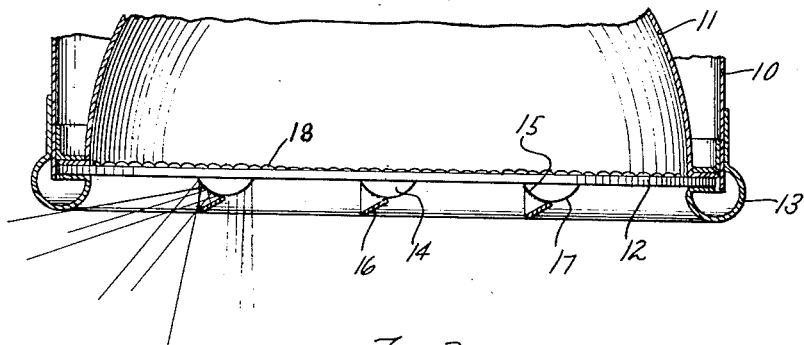
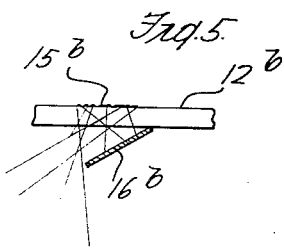
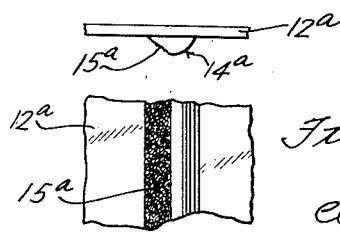
INVENTOR
SAMUEL F. ARBUCKLE
BY
Chester W. Braselton
ATTORNEY Patented Jan. 28, 1930

1,744,725

UNITED STATES PATENT OFFICE

SAMUEL F. ARBUCKLE, OF HIGHLAND PARK, MICHIGAN, ASSIGNOR TO MONOGRAM LENS CORPORATION, OF PATERSON, NEW JERSEY, A CORPORATION OF DELAWARE

HEADLIGHT LENS

Application filed April 22, 1927. Serial No. 185,690.

This invention relates to headlights for automobiles, and more particularly to lenses for such headlights.

One object of the invention is to provide a headlight which will diffuse a portion of the light rays passing through the lens thereof, and direct such diffused portion toward the right-hand side of the road.

Another object of the invention is to provide a headlight, which will not only diffuse a portion of the light rays passing through the lens thereof, but which will prevent such diffused rays from causing a glare to drivers of other vehicles or pedestrians approaching along the road.

Other advantages of the invention will be apparent as the description proceeds.

The invention will best be understood in connection with the accompanying drawings, in which Figure 1 is a front elevation of a headlight embodying my invention;

Figure 2 is a part sectional plan view of the headlight shown in Figure 1;

Figures 3 and 4 are a sectional plan and elevation, respectively, of another embodiment of the invention;

Figure 5 is a sectional view of another embodiment; and

Figure 6 is a sectional view of still another embodiment of the invention.

Referring now more specifically to the drawings, I have shown my invention as applied to a headlight comprising a casing 10 having a reflector 11 supported therein, and a light source (not shown) supported in the reflector. A lens 12 is held in place in front of the reflector 11 by a rim 13, which is adapted to be attached to the open end of the casing, and when so attached forms part of the casing. The lens 12 has provided on its forward surface a plurality of ribs 14 which extend vertically and terminate adjacent the rim 13. The ribs 14 are shown as having a semi-cylindrical cross-section and are preferably formed integral with the lens 12. The left side 15 of each rib may be stippled or roughened from the outermost point of the rib to the intersection with the surface of the lens.

In front of each rib, I have provided a long narrow strip of light impervious material as a shield 16 adapted to be supported by the rim 13 and extending parallel to each rib and slightly to the left thereof so that the shield will cut off all diffused light projected at right angles to the surface of the lens. The shields 16 may be bent at an angle so that the right edges of the shields lie adjacent to the ribs, while the left edges extend out at an angle to the surface of the lens, thereby permitting diffused light to be directed outwardly toward the left side of the lens. I prefer to make these shields integral with the rim 13 of the casing, but they may be formed separately and of other material, if desired, and attached to the rim in any desired manner, such as welding.

In Figure 3, I have shown a rib 14$^a$ integral with a lens 12$^a$, in which the stippled surface 15$^a$ is flattened from the surface of the lens to the outermost part of the rib.

In Figure 5, I have shown a lens 12$^b$ without any ribs, but having a strip of stippled surface 15$^b$ extending vertically on the inner side thereof. A shield 16$^b$ is placed similarly to the shield 16 in Figures 1 and 2 to prevent the diffused rays from being projected forwardly or to the right of the lens.

In Figure 6 another embodiment of the invention is shown in which a vertical rib 14$^c$ having the cross-section of a right angle triangle is shown formed integral with the lens 12$^c$. The sloping side of the rib 15$^c$ is stippled to diffuse the light and a suitable shield 16$^c$ is attached directly to the lens 12$^c$. This shield may be painted on the glass or it may be made of a thin strip of metal or other material cemented on the glass.

In the operation of the headlight, parallel rays are directed through the lens, and when these rays strike the right-hand side 17 of the ribs 14, they are deflected toward the left of the lens or the right-hand side of the road as viewed from the driver's seat. Due to the direction of the projected rays from the reflector, and the fact that the rib is vertical, these rays will not cause any glare to the approaching driver, but will be directed downwardly toward the road. The rays, however, which strike the left or stippled side of the rib 15 are diffused so that they project in every direction with the result that the left side of the lens or the right side of the road, as viewed from the driver's seat, is lighted with diffused light, thus making it possible to not only see the right side of the road when driving at night, but to see sign posts or objects at considerable height above the automobile and at the right side of the road. The shields 16 are so placed that no part of the stippled surface of the ribs 14 is visible from directly in front of the lens or from the right-hand side thereof, or the left side of the road, as viewed from the driver's seat. This prevents any objectionable glare from being seen by drivers of approaching cars.

With the embodiment shown in Figures 3 and 4, I have found it unnecessary to use the shield 16, as it is impossible to see the flat stippled surface, and therefore the glare caused thereby, from a position on the right-hand side of the lens or anywhere in back of a plane passing through the stippled surface of the rib, but the shield may be used if desired.

The operation of the embodiment shown in Fig. 5 is similar to that already described. The light is diffused passing through the stippled surface 15$^b$ and the shield 16$^b$ prevents rays from passing directly normal to the lens 12$^b$.

The embodiment shown in Figure 6 permits the shield and the lens to be made as one unit and the operation is the same as has already been described.

It may be desirable to cut off only the forwardly directed diffused rays and permit diffused rays to be directed both to the left and the right, thereby lighting up both sides of the road, and if so, the shield may be made narrower or the angle of the shield with respect to the lens may be altered so as to permit light to pass out at each side thereof, or the entire surface of the rib 14 may be stippled and the shield made wider so as to cut off the desired forwardly directed rays but permit free diffusion at the sides.

The inner surface of the shields may be polished if desired to form reflecting surfaces so that the light thrown toward the side may be increased. Also a plurality of vertical flutes 18 may be provided on the rear surface of the lens to spread the beam laterally across the road.

While I have shown three ribs on the lens in Figures 1 and 2, any desired number of ribs may be used. The light cut off by the shields is not sufficient to cause a lack of illumination at the center of the beam, even with several more ribs than have been illustrated in the drawings, but I prefer to use only enough of the ribs to produce a sufficient light toward the right-hand side of the road.

While I have shown several embodiments of the invention, many changes in construction may be resorted to without departing from the spirit of the invention, and I desire it to be understood, therefore, that my invention is not limited to any specific form or arrangement of parts except in so far as such limitations are specified in the claims.

Having thus described my invention what I desire to claim is:

1. In a headlight comprising a casing, a reflector supported within said casing and a light source in said reflector; a lens in front of said reflector and having a portion of the surface roughened to diffuse the light passing therethrough; and means comprising shields integral with said casing for cutting off a portion of the diffused light.

2. In a headlight comprising a casing, a reflector in said casing, and a light bulb positioned in said reflector; a lens in front of said reflector having a vertical rib on the outer surface thereof, one side of said rib being roughened to diffuse the light passing therethrough; a narrow shield attached to said casing and extending parallel to said rib, one side of said shield being adjacent the center of said rib and the other side extending outwardly at an angle to the face of said lens.

3. In a headlight, a lens, a plurality of vertical flutes on the rear surface; a plurality of semi-cylindrical ribs on the front surface thereof, one side of each of said ribs being roughened, and a shield supported adjacent each rib directly in front of the roughened surface thereof.

In testimony whereof, I affix my signature.

SAMUEL F. ARBUCKLE.